Sept. 16, 1924.
R. G. BULLOCK
SINGLE UNIT KNOCKDOWN SECTION
Filed June 16, 1920    6 Sheets-Sheet 2
1,508,917
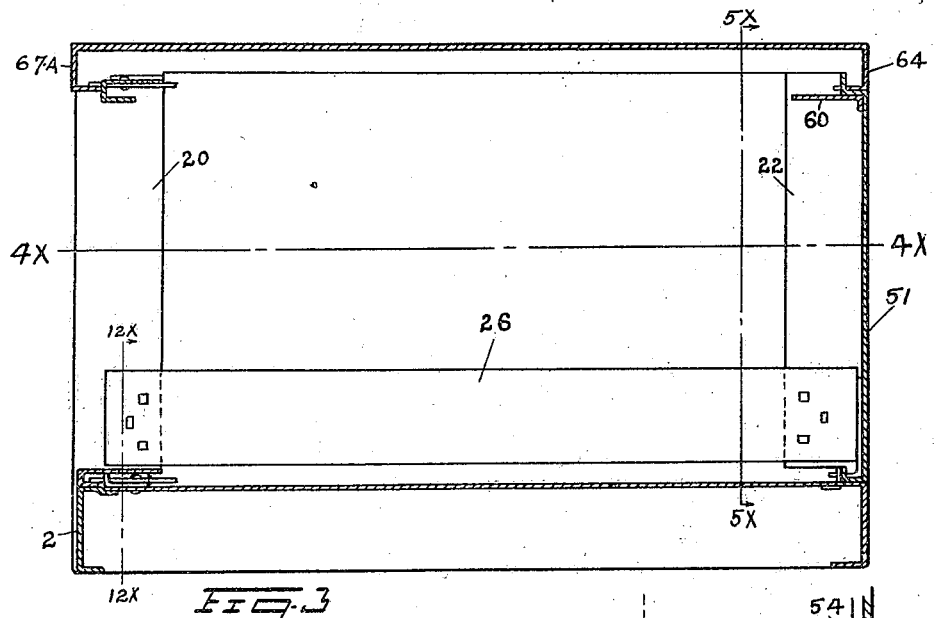
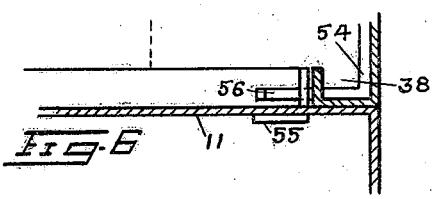
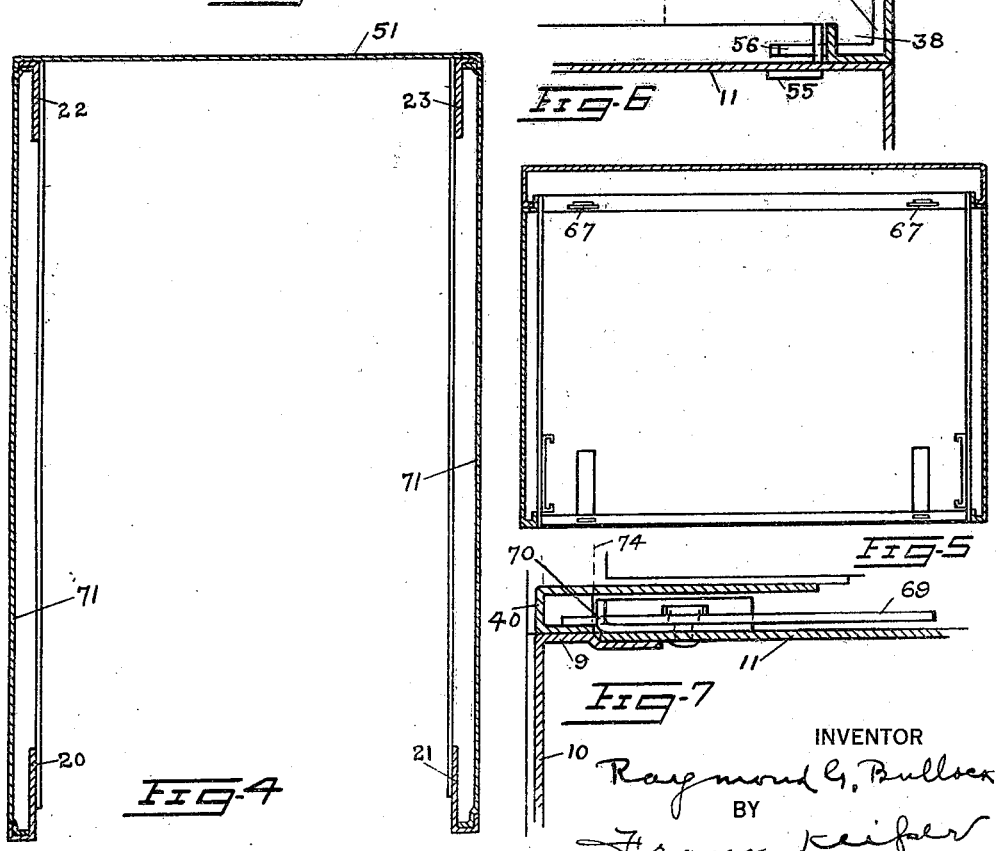
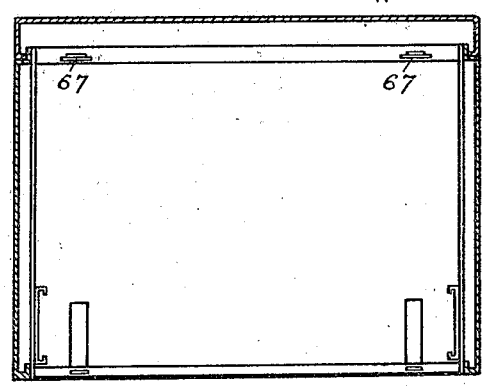
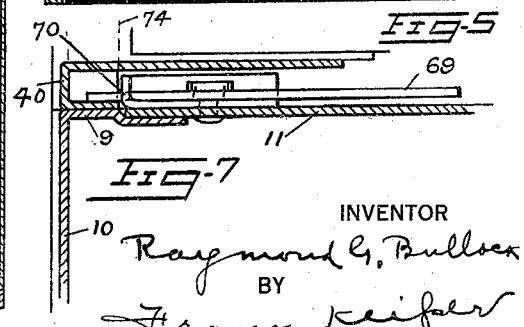
INVENTOR
Raymond G. Bullock
BY
Frank Keifer
ATTORNEY

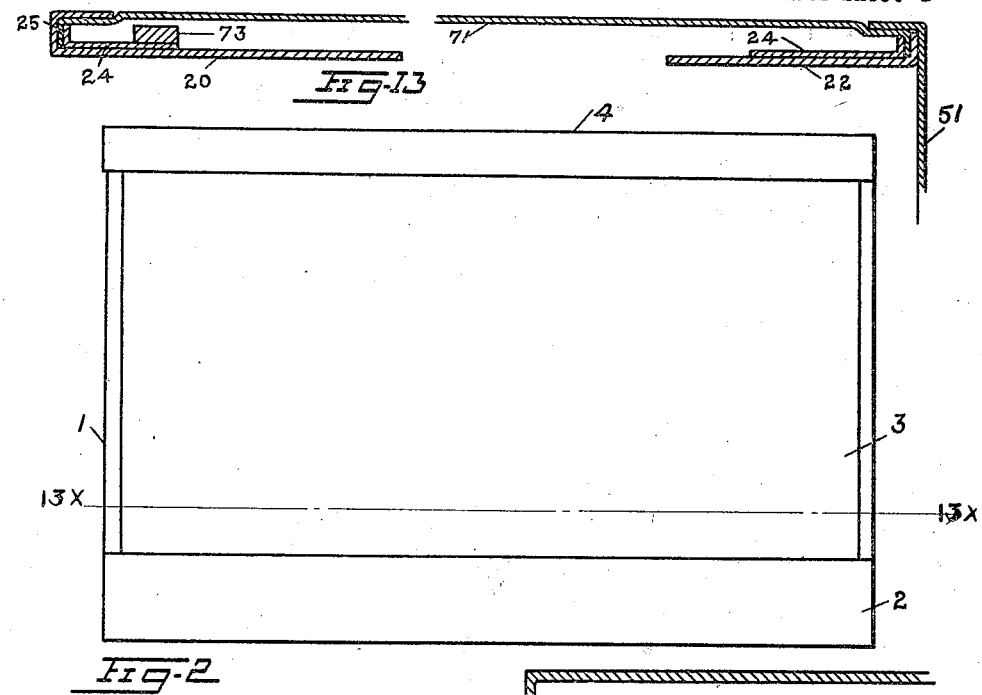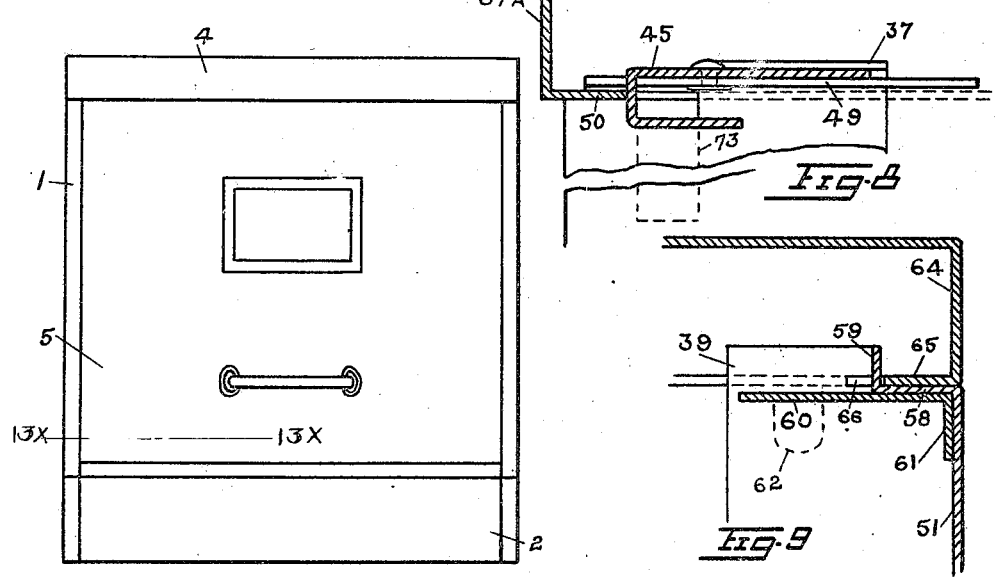

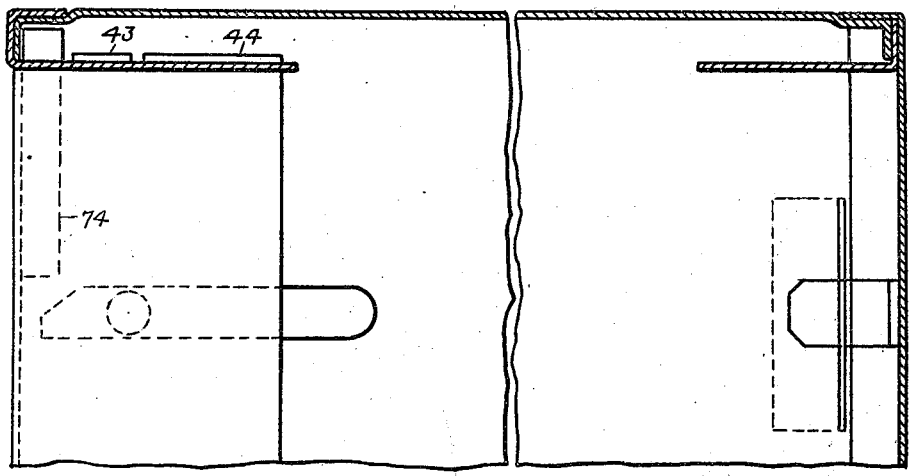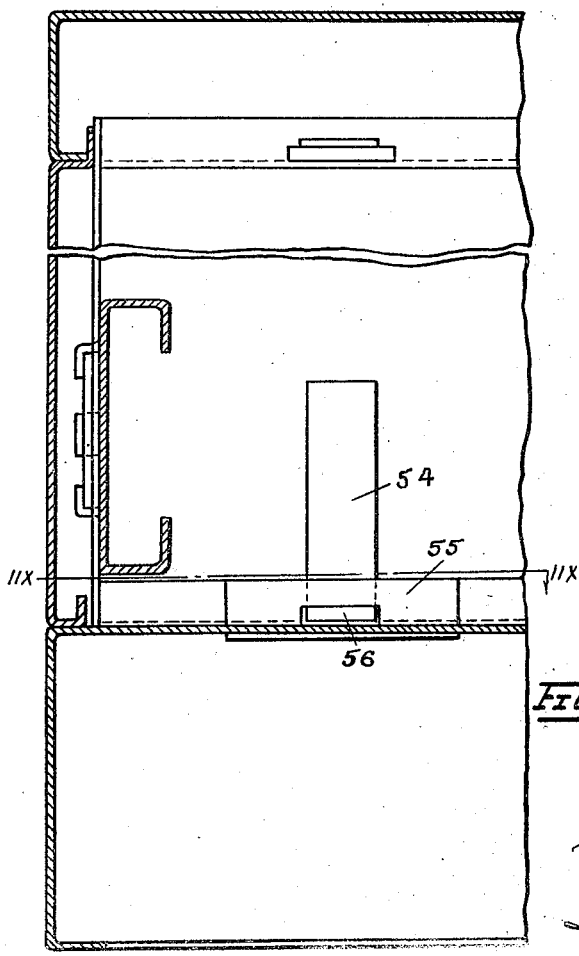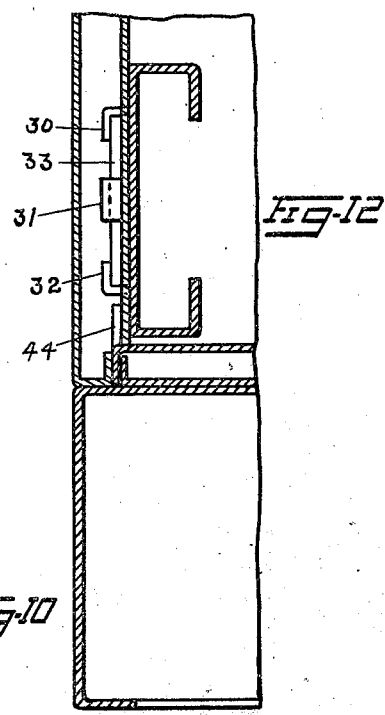

Sept. 16, 1924.
R. G. BULLOCK
1,508,917
SINGLE UNIT KNOCKDOWN SECTION
Filed June 16, 1920    6 Sheets-Sheet 4
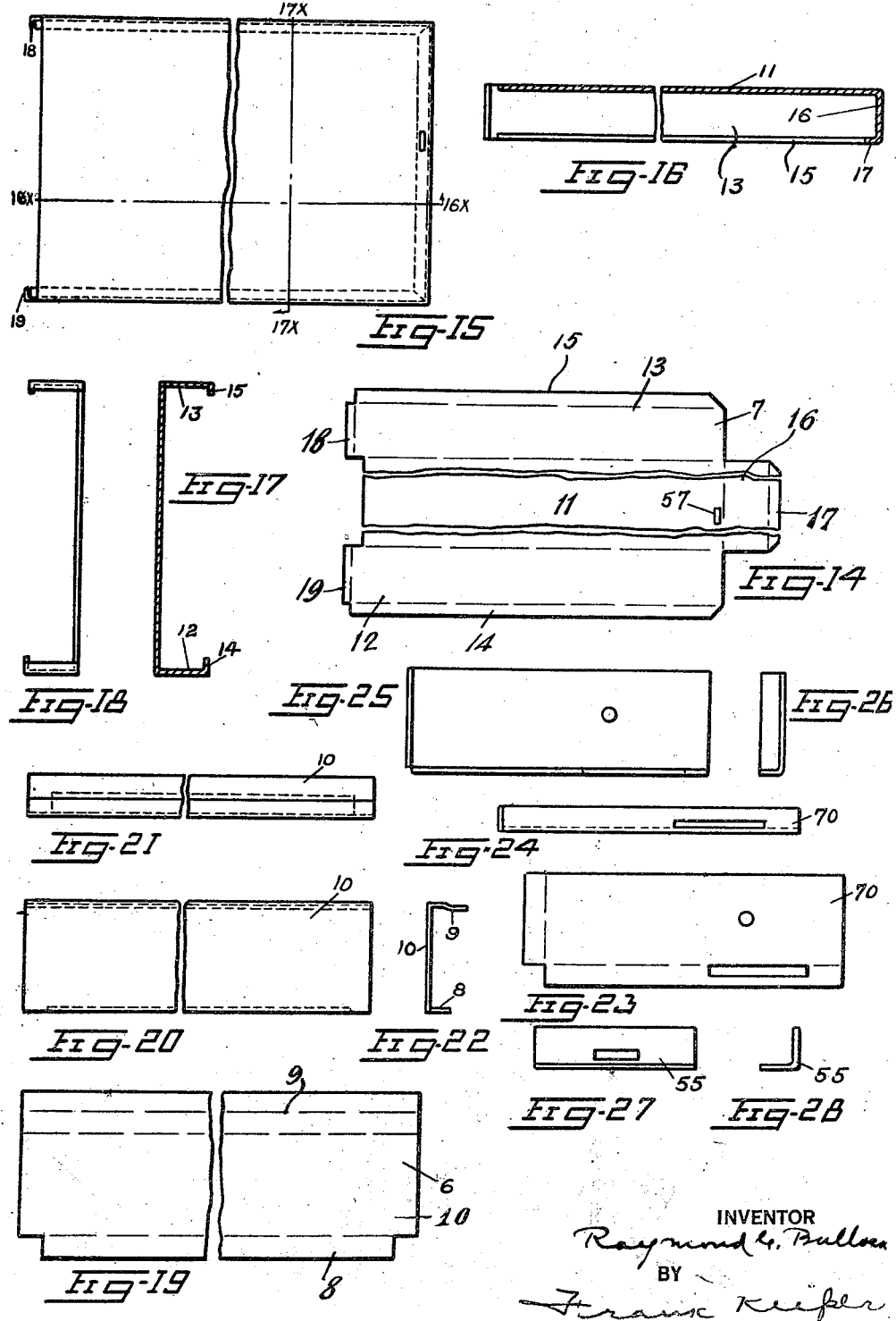
INVENTOR
Raymond G. Bullock
BY
Frank Keifer
ATTORNEY Sept. 16, 1924.
R. G. BULLOCK
SINGLE UNIT KNOCKDOWN SECTION
Filed June 16, 1920
1,508,917
6 Sheets-Sheet 5
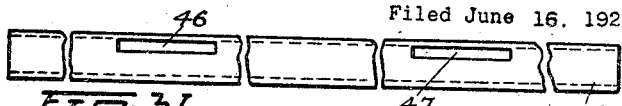
Fig-31
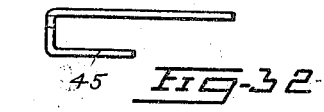
Fig-32
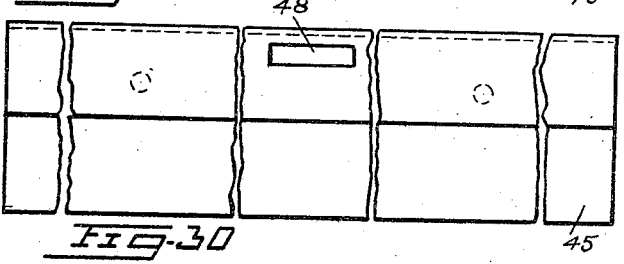
Fig-30
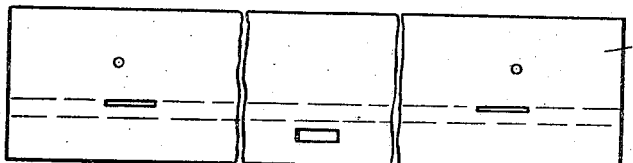
Fig-29
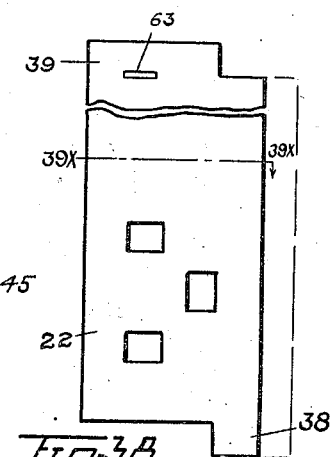
Fig-38
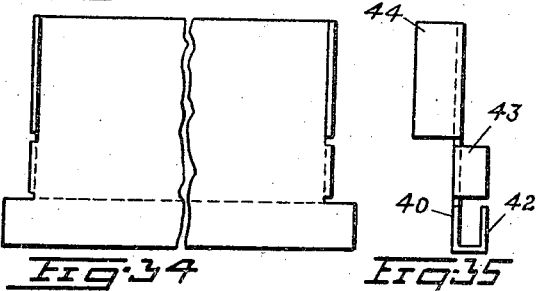
Fig-34
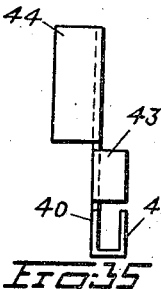
Fig-35
Fig-39
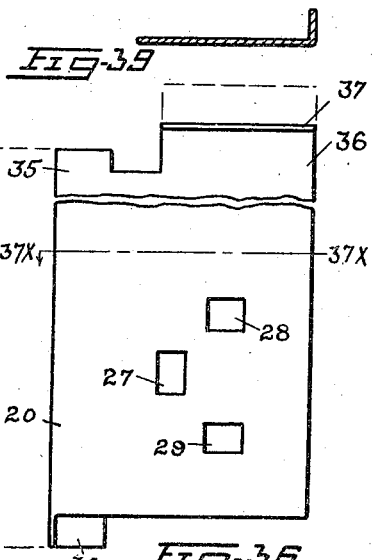
Fig-36
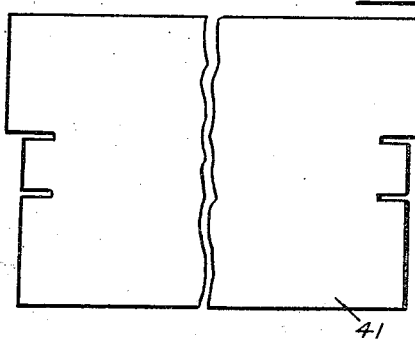
Fig-33
Fig-37
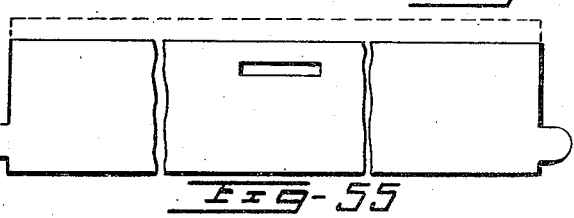
Fig-55
INVENTOR
Raymond G. Bullock
BY
Frank Keifer
ATTORNEY

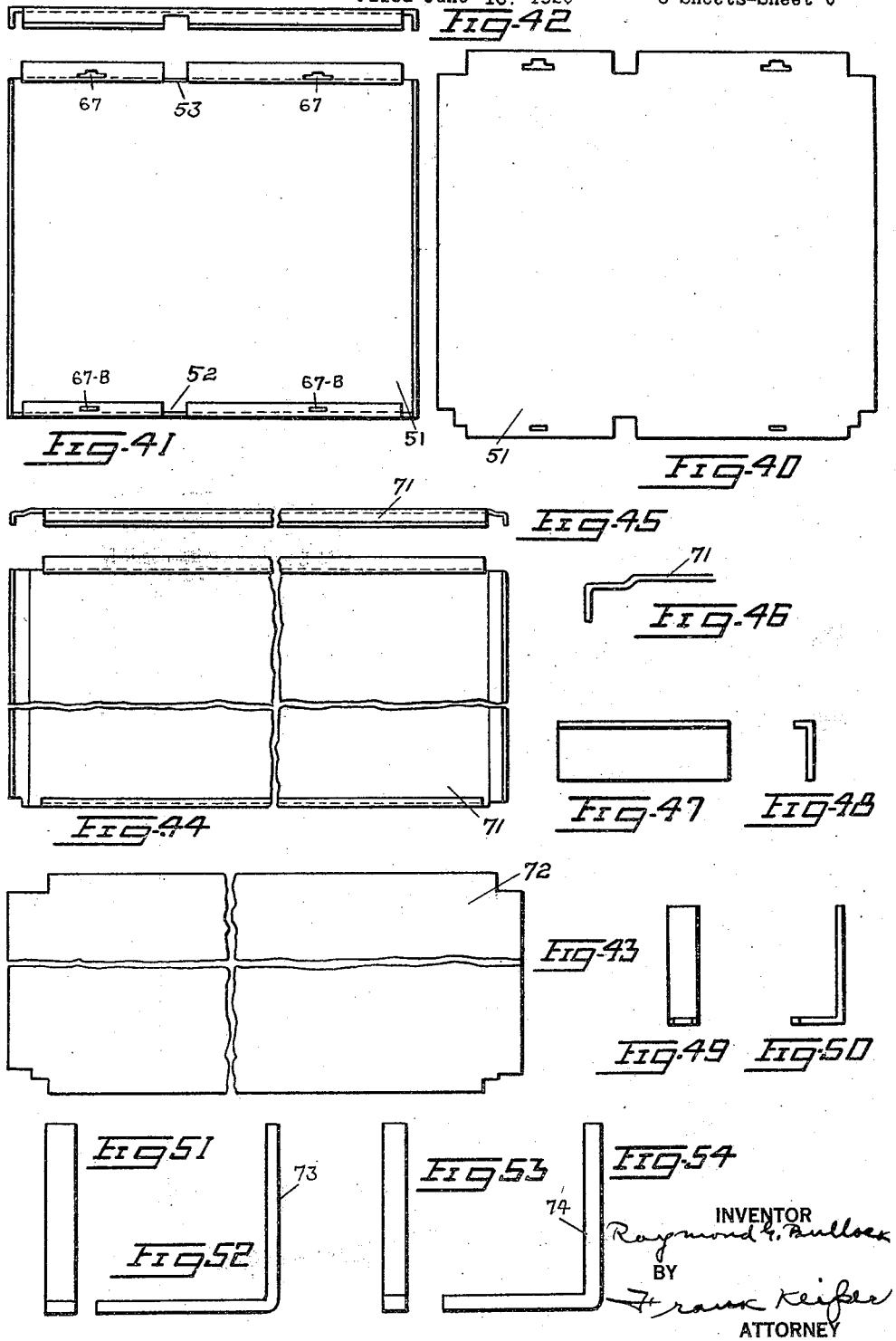

Patented Sept. 16, 1924.

1,508,917

UNITED STATES PATENT OFFICE.

RAYMOND G. BULLOCK, OF BALTIMORE, MARYLAND.

SINGLE-UNIT KNOCKDOWN SECTION.

Application filed June 16, 1920. Serial No. 389,500.

*To all whom it may concern:*

Be it known that I, RAYMOND G. BULLOCK, a citizen of the United States, residing at Baltimore, in the county of Baltimore and State of Maryland, have invented certain new and useful Improvements in Single-Unit Knockdown Sections, of which the following is a specification.

The object of this invention is to provide a new and improved form of one drawer metal filing section.

This and other objects of the invention will be fully illustrated in the drawings, described in the specification and pointed out in the claims at the end thereof.

In the drawings,

Figure 1 shows a front elevation of the one drawer section.

Figure 2 shows an end elevation of the one drawer section.

Figure 3 shows a vertical, longitudinal section thru the case with the drawer removed.

Figure 4 shows a horizontal section thru the case, the section being taken on the line $4^x$—$4^x$ of Figure 3.

Figure 5 shows a vertical, transverse section, taken on the line $5^x$—$5^x$ of Figure 3, the base being omitted.

Figure 6 shows an enlarged view in section showing the connection between the base and body structure, the corresponding parts appearing at the lower right hand corner of Figure 3.

Figure 7 shows an enlarged view in section, showing the connection between the base and body structure, the corresponding parts appearing at the lower left hand corner of Figure 3.

Figure 8 shows an enlarged view in section, showing the connection between the top and the body structure of the case, the corresponding parts appearing at the upper left hand corner of Figure 3.

Figure 9 shows an enlarged view in section showing the connection between the top and the body structure of the case, the corresponding parts appearing at the upper right hand corner of Figure 3.

Figure 10 shows a vertical, transverse section, partly broken away, the section being taken on the line $5^x$—$5^x$ of Figure 3, and showing the parts enlarged over those shown in Figure 5 with the base added.

Figure 11 is a horizontal section on the line $11^x$—$11^x$ of Figure 10, looking down.

Figure 12 is a vertical, transverse section on the line $12^x$—$12^x$ of Figure 3.

Figure 13 shows a horizontal section thru the end of the case from front to back on the line $13^x$—$13^x$ of Figures 1 and 2, the end being partly broken away and the roller suspension support being omitted.

Figure 14 is a plan view of the blank for the rear part of the base, the blank being shown partly broken away.

Figure 15 shows a top plan view of the rear part of the base formed from the blank in Figure 14, the base being shown partly broken away.

Figure 16 is a vertical section on the line $16^x$—$16^x$ of Figure 15.

Figure 17 is a vertical section on the line $17^x$—$17^x$ of Figure 15.

Figure 18 is an end elevation of the base shown in Figure 15 as viewed from the left hand end.

Figure 19 is a plan view of the blank for forming the front section of the base, the blank being shown partly broken away.

Figure 20 is a front elevation of the front section of the base folded from the blank shown in Figure 19.

Figure 21 is a top plan view of the front section of the base shown in Figure 20.

Figure 22 is an end elevation of the front portion of the base viewed from the right of Figure 20.

Figure 23 is a plan view of the blank for the locking clip on the base at the front.

Figure 24 is a front elevation of the clip bent up from the blank shown in Figure 23.

Figure 25 is a top plan view of the clip shown in Figure 24.

Figure 26 is an end elevation of the clip shown in Figure 25.

Figures 27 and 28 are rear and end elevations of the locking clip on the base at the rear.

Figure 29 is a top plan view of a blank for the top strike at the front of the case, the blank being shown partly broken away.

Figure 30 is a bottom plan view of the strike formed from the blank in Figure 29, the strike being shown partly broken away.

Figure 31 is a front elevation of the top strike shown in Figure 30, the strike being shown partly broken away.

Figure 32 is an end elevation of the top strike shown in Figure 31.

Figure 33 is a plan view of the blank from which the bottom strike is formed, the blank being shown partly broken away.

Figure 34 is a top plan view of the bottom strike formed from the blank shown in Figure 33, the strike being shown partly broken away.

Figure 35 is an end elevation of the bottom strike shown in Figure 34.

Figure 36 is an elevation of one of the front uprights, shown partly broken away. The dotted line extensions show the outlines of the blank.

Figure 37 is a horizontal section on the line 37×—37× of Figure 36, looking down.

Figure 38 is a side elevation of the rear upright, the upright being shown partly broken away.

Figure 39 is a horizontal section on the line 39×—39× of Figure 38.

Figure 40 is a plan view of the blank from which the back is formed.

Figure 41 is a front elevation of the back formed from the blank shown in Figure 40.

Figure 42 is a top plan view of the back shown in Figure 41.

Figure 43 is a plan view of the blank for one of the ends, the blank being shown partly broken away.

Figure 44 is an elevation of the end formed from the blank shown in Figure 43, the end being shown partly broken away.

Figure 45 is a top plan view of the end shown in Figure 44, the end being shown partly broken away.

Figure 46 is a detail view of the left hand portion of Figure 45.

Figures 47 and 48 are front and end elevations of the spacer.

Figures 49 and 50 are front and side elevations of a clip for the back.

Figures 51 and 52 are side and end elevations of the reinforcement at the top of the case.

Figures 53 and 54 are side and end elevations of the reinforcement at the bottom of the case.

Fig. 55 is a top plan view of the guide plate for the locking mechanism.

In the drawings, like reference numerals indicate like parts.

In the drawings, reference numeral 1 indicates the case of the unit drawer section, comprising a base 2, a body structure 3, a top 4 and a drawer 5. The base 2 is formed of two sheets of metal, the blank for the front portion being indicated at 6 and the blank for the rear portion being indicated at 7. The blank for the front portion of the base is bent to form the foot 8, the top 9 and the front panel 10. The blank for the rear portion is bent to form the top 11, the sides 12 and 13, the feet 14 and 15, the back wall 16 with the foot 17. The forward edge of the side is bent in as shown at 18 and 19 to form ribs which have the appearance of uprights. The front part of the base is joined to the rear part by inserting it from below so that the top 9 of the forward section engages under the top 11 of the rear section and supports it. The top 9 is for that purpose provided with a fillet so that a portion of the top 9 extends under the top 11 and the two parts of the base are spot welded or otherwise suitably fastened together.

The flanges 18 and 19 serve as guides to hold the front of the base in place.

The body section is made up of four uprights, 20 and 21 at the front and 22 and 23 at the back. The uprights 20 and 21 are channel shaped with the channels opening rearwardly and outwardly and the uprights 22 and 23 are angle irons with the flanges extending outwardly. The uprights 20 and 21 are formed as indicated in Figures 36 and 37 and the uprights 22 and 23 are formed as indicated in Figures 38 and 39. The uprights 20 and 21 are provided with angles or spacers 24 welded thereto, (see Figure 13), the flange of the spacer being spaced a small distance from the bottom of the channel so as to leave room for the flange 25 on the end when the end is inserted. The uprights 22 and 23 are provided with angles spot welded thereto in the same manner and for the same purpose.

The uprights 20 and 21 are joined together at the top by the top strike shown in Figures 29–32 and are joined together at the bottom by the bottom strike shown in Figures 33, 34 and 35, the overlapping parts being welded together. The bottom strike 40 is bent up from a blank 41 shown in Figure 33. This strike at the forward end is provided with the channel 42 and on each side has an extension bent down to form a flange 43 and an extension bent up to form a flange 44. The uprights are placed inside of the flanges 44 and are welded to them. The tops of the front uprights 20 and 21 have extensions 35 and 36 formed thereon and the bottoms have extensions 34 thereon. The extension 34 forms the front and the outside of the channel, the inside of the channel being cut away. The extension 36 is provided with a flange 37 bent inwardly thereon and these flanges overlap the top strike and are welded thereto. In this manner, the top and bottom strikes and the two front uprights 20 and 21 are joined together to form a panel or frame.

The top strike 45 is shown in Figures 30, 31 and 32 and is formed from the blank shown in Figure 29. This strike is channel shaped as shown in end elevation in Figure 32 and has two openings 46 and 47 in the front thereof and has an opening 48 in the bottom. Pivotally mounted to the underside of this strike are the locking buttons 49 which pass thru the openings 46 and 47 and engage above the flange 50 on the bottom of the front of the cover.

The uprights 22 and 23 are connected together at the back by the back plate 51 to which they are preferably welded. The blank for this back is shown in Figure 40 and the front elevation of the back plate formed from the blank is shown in Figure 41.

Each of the rear uprights 22 are provided with an extension 38 at the bottom and with an extension 39 at the top. The extension 38 engages in the channel formed at the bottom of the back as shown in Figures 6 and 3 and the flanges 39 engage in front of the flange 59 bent up from the back at the top. See Fig. 9. The rear uprights are perforated as indicated at 63 in Fig. 38 to receive the extensions 62 on the guide plate 60 for the locking apparatus.

The uprights 20 and 22 are connected together at the bottom by the guide 26 of the roller suspension and the uprights 21 and 23 are connected in the same manner. In this way, the front and back frames of the case are joined together. Any number of the roller suspension guides may be used for this purpose. The uprights are provided with openings 27, 28 and 29, into which project suitable lugs 30, 31 and 32, formed on the guide, the uprights and the guide being locked together by a key 33.

It will be understood that while but one big drawer is shown, the section may be provided with several smaller drawers instead, each of which drawers will require two guides for its roller suspension so that the uprights on each side, front and back will be held together by two guides. If but one drawer is used in the section, an idle guide can be used at the top or simply a bar might be used interlocked with the uprights in the same way as are the guides.

At the bottom of the back plate is provided the notch 52 and at the top is provided the notch 53 for locking mechanism. Nested in the opening 67$^B$ is provided the angle reinforce or fastener 54 which is welded to the back. On the base 11 is provided a locking clip or support 55 for the fastener 54. This clip is perforated as shown in Fig. 10 to receive the tongue 56 which goes thru the opening therein. The base is perforated to receive the locking clip as shown at 57 in Fig. 14. The parts come together at the back as shown in sectional elevation in Fig. 6. See also Fig. 10 for a front sectional elevation and Fig. 11 for a top plan view. At the top the back is bent inwardly with a flange 58 and upwardly with a flange 59. The guide plate 60 for the locking apparatus is welded to the flange 58. This plate 60 is angle shaped, being provided with the flange 61 that bears against the back. The plate 60 is provided with an extension 62 which passes thru an opening 63 in the top of the upright 22 shown at the top of Fig. 38 and this extension is bent down as shown in dotted lines in Fig. 9, and in this way the uprights 22 and 23 are locked together with the guide plate 60 and the back 51.

The top of the case is formed from a single piece of metal bent with flanges on four sides thereof and flanges projecting inwardly from the bottom of the sides forming a channel shaped rim all around.

At the back, the top is provided with the vertical flange 64 on the bottom of which is provided the inwardly projecting flange 65 on which is provided the extension 66 which pass thru openings 67, 67, in the flange formed on the top of the back so that by this engagement the top is locked to the back. At the front the vertical flange 67$^A$ is provided with the inwardly projecting flange 50 on top of which engages the locking buttons 49 pivotally mounted on the top strike against the front of which the flange 50 makes a close fit.

The body makes engagement with the base at the back by means of the tongues 56 as shown in Figs. 6 and 10 and the body is fastened to the bottom at the front by the engagement of the buttons 69, pivotally mounted on top of the bottom section as shown in Fig. 7, the forward ends of which buttons pass thru a slotted clip 70, shown in Figs. 23–26, inclusive, and engage with the lower flange of the bottom strike 40 as shown in Fig. 7.

The ends 71, 71, are formed from the blank 72 shown in Fig. 43, the end as formed being shown in Figs. 44, 45 and 46. These ends are inserted in the channels that are formed at the front of the case on the uprights 20 and 21 and at the back of the case in the channels formed between the uprights 22 and 23 and the flanges on the sides of the back plate 51. The end is moved edgewise to position by being inserted either from the top or the bottom, and if inserted from the top, the cover is put in place thereafter.

The front frame is reinforced in corners by reinforcements 73 at top and 74 at bottom, shown in Figs. 7, 8, 11, 13, 51, 52, 53 and 54.

It will be understood that this unit is made knock-down so that a number of bases can be shipped separately in one package, a number of tops in another package, the top and bottom strikes in another package, the back and parts attached thereto in another package, the front uprights in another package, the connections between the front uprights and backs in another package, and other details will be made up into other packages. It will be understood that the case can be assembled at the factory and shipped complete but a large number of cases assembled and shipped complete will take up much more space and cost more than if the cases are knocked down and the parts are shipped separately, as above described.

When the shipment has reached its destination, the various parts can be unboxed and grouped in the warehouse, and kept as open stock, saving storage room, and the pieces can be assembled and delivered as fast as the cases are needed.

I claim:

1. A case having a base made up of a front section and a back section, the top of the front section having a horizontal extension connected thereto by a fillet, said extension engaging under the top of the rear section.

2. A case having a base made up of a front section and a back section, the top of the front section having a horizontal extension connected thereto by a fillet, said extension engaging under the top of the rear section and fastened thereto.

3. A case having a base made up of a front section and a back section, inwardly turned upright flanges formed on the front of the sides of the rear section and spaced forward of the cover of the rear section, the front section engaging in said flanges as guides and being held in place thereby.

4. A case having a base made up of a front section and a back section, inwardly turned upright flanges formed on the front of the sides of the rear section and spaced forward of the cover of the rear section, the front section engaging in said flanges as guides and being held in place thereby, said front section having a top and an extension connected thereto by a fillet, said extension engaging under the top of the rear section.

5. A case having a base, a channel shaped strike on the forward edge thereof, a clip having a locking button thereon fastened at the top of said base, said button engaging said strike and holding it in place.

6. A case having a front frame having a channeled strike at the top and bottom and channeled uprights at the sides, the strike at the top extending above the front of the sides and forming an interlocking shoulder, said parts being fastened together.

7. A case having a back frame made up of two uprights and a back plate fastened thereto, said back plate having a channel at the bottom, an extension on the uprights at the bottom engaging with said channel.

8. A case having a back frame made up of two uprights and a back plate fastened thereto, said back plate having a flange bent inwardly and upwardly at the top, said uprights having extensions at the top engaging in front of the upwardly bent flange and forming an interlocking shoulder.

9. A case having a back plate, an inwardly projecting flange at the top, a guide plate fastened to said flange, said plate having an opening therein with which a locking mechanism can engage.

10. A case having a back plate, an inwardly projecting flange at the top, a guide plate fastened to said flange, said plate having an opening therein for the locking mechanism, uprights on each side of said back plate, said uprights having openings therein near the top, extensions on said guide plate adapted to engage in said openings.

11. A case having uprights at the front on each side thereof, strikes connecting said uprights, uprights at the back thereof on each side thereof, a back plate connecting said uprights together, a guide plate on each side interlocking with the front and back uprights and holding them together, the top strike extending above the front of the uprights and forming an interlocking shoulder.

12. A case having a top formed from a single piece of metal bent with flanges on four sides thereof, angles bent inwardly on said flanges forming channels on said sides, forming a channel shaped rim all around, said cover being flush with the case on three sides and having forwardly extending tongues at the back adapted to engage and interlock with the back plate.

13. A case having a base, a clip extending upwardly thru the base and fastened thereto, said clip having an opening therein above the base, a back plate, an angle reinforce attached thereto and extending forward thru the opening in said clip.

14. A case having a back with an inwardly and upwardly extending flange on the top thereof, a recess therein, a top having a channel shaped rim on the back thereof, an extension on said rim engaging said recess.

15. A case having a frame with a channel shaped strike at the top, a top for said case having a channel shaped front edge, a locking button extending thru said strike and engaging in the channel shaped front edge of the top.

In testimony whereof I affix my signature.

RAYMOND G. BULLOCK.